(12) United States Patent
Matayoshi

(10) Patent No.: US 8,186,470 B2
(45) Date of Patent: May 29, 2012

(54) MOTORCYCLE

(75) Inventor: Kota Matayoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 12/838,882

(22) Filed: Jul. 19, 2010

(65) Prior Publication Data

US 2011/0031054 A1 Feb. 10, 2011

(30) Foreign Application Priority Data

Aug. 10, 2009 (JP) .................................. 2009-185674

(51) Int. Cl.
*B62D 61/02* (2006.01)

(52) U.S. Cl. ........................................ 180/227; 303/137

(58) Field of Classification Search .................. 180/227, 180/219, 221, 312, 291; 188/24.11; 303/137, 303/3, DIG. 10
See application file for complete search history.

(56) References Cited

U.S. PATENT DOCUMENTS

| | | | | |
|---|---|---|---|---|
| 4,494,800 A | * | 1/1985 | Hayashi | 303/9.64 |
| 4,697,825 A | * | 10/1987 | Hayashi et al. | 280/276 |
| 4,852,701 A | * | 8/1989 | Wakatsuki | 188/181 A |
| 5,419,625 A | * | 5/1995 | Iwase et al. | 303/116.1 |
| 7,547,030 B2 | * | 6/2009 | Toyoda et al. | 280/286 |
| 7,665,563 B2 | * | 2/2010 | Misaki et al. | 180/227 |
| 7,669,680 B2 | * | 3/2010 | Hasegawa | 180/219 |
| 7,708,098 B2 | * | 5/2010 | Toyoda | 180/219 |
| 2006/0151226 A1 | * | 7/2006 | Misaki et al. | 180/227 |
| 2009/0242313 A1 | * | 10/2009 | Morita et al. | 180/312 |
| 2010/0000818 A1 | * | 1/2010 | Fukuyama et al. | 180/309 |
| 2011/0127829 A1 | * | 6/2011 | Hayashi et al. | 303/6.01 |

FOREIGN PATENT DOCUMENTS

| | | |
|---|---|---|
| EP | 0 417 727 A1 | 3/1991 |
| EP | 1 514 787 A1 | 3/2005 |
| JP | 2006-192980 A | 7/2006 |

* cited by examiner

*Primary Examiner* — Tashiana Adams
(74) *Attorney, Agent, or Firm* — Westerman, Hattori, Daniels & Adrian, LLP

(57) ABSTRACT

A motorcycle includes front and rear brakes that respectively brake a front wheel and a rear wheel, an ABS unit that controls braking force of the brakes, pipes connecting each of the brakes and the ABS unit, a swing arm swingably supported on a body frame, and a rear cushion unit connecting the swing arm to the body frame and located in front of the rear wheel which is supported on a rear end portion of the swing arm. Further, the rear cushion unit is located on a body centerline, extending longitudinally while passing through the center in a vehicle width direction. Additionally, the ABS unit is located rearward of the rear cushion unit and on the body centerline.

19 Claims, 6 Drawing Sheets

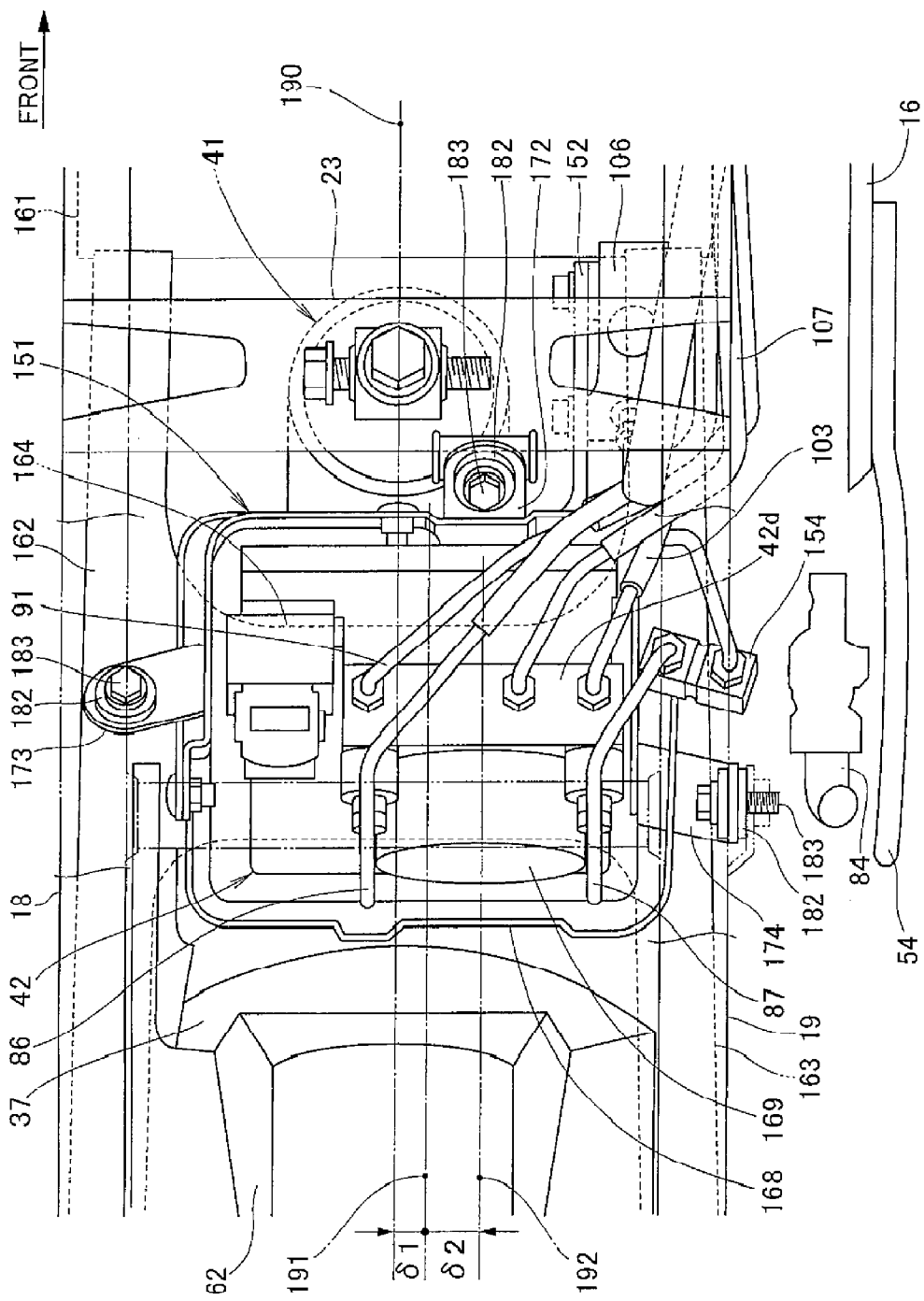

MOTORCYCLE

BACKGROUND OF THE INVENTION

The present invention relates to an improvement in a motorcycle. The present invention is suitable for a motorcycle including an ABS and a front and rear wheel interlocking brake device.

According to the related art, a motorcycle is known including an ABS unit that controls the lock of the front and rear wheels to prevent a skid, and a rear cushion unit passed between the body frame and the swing arm to mitigate impact from the rear wheel. More specifically, according to FIG. 4 of JP-A No. 2006-192980, a rear cushion unit 38 is located on a body centerline 91, and an ABS unit 64 is located so as to be offset in the vehicle width direction with respect to the rear cushion unit 38.

When the ABS unit 64 that is a relatively heavy object is located so as to be offset in the vehicle width direction, it is difficult to optimize the left-right weight distribution of the motorcycle.

In addition, since the piping length becomes long unless piping to the brake is installed along the side to which the ABS unit 64 is offset in the body of the motorcycle, improved freedom of piping is desired.

SUMMARY OF THE INVENTION

A motorcycle is described which facilitates optimization of the left-right weight distribution of the body, and also makes it possible to increase the freedom of brake piping.

In an aspect of the invention, a motorcycle includes, front and rear brakes that respectively brake a front wheel and a rear wheel; an ABS unit that controls braking force of the brakes; pipes connecting each of the brakes and the ABS unit; a swing arm swingably supported on a body frame; and a rear cushion unit connecting the swing arm to the body frame and located in front of the rear wheel supported on a rear end portion of the swing arm, in which the rear cushion unit is located on a body centerline extending longitudinally while passing through the center in a vehicle width direction, and wherein the ABS unit is located rearward of the rear cushion unit and on the body centerline.

In another aspect of the invention, a lower end of the rear cushion unit is linked to the swing arm via a linking member, and an axis of the rear cushion unit extends in a generally vertical direction.

In another aspect of the invention, the swing arm includes a pair of arm portions extending longitudinally on the left and right sides of the rear wheel, and a swing arm cross member linking between the pair of arm portions in front of the rear wheel, and the ABS unit is located above the swing arm cross member.

In an aspect of the invention, the body frame includes a pair of left and right seat rails extending rearward from a central portion thereof to support a seat, and a cushion unit cross member laterally linking the left and right seat rails to one another and supporting an upper end portion of the rear cushion unit, and the ABS unit is secured to the upper cross member and the left and right seat rails.

In an aspect of the invention, the rear brake includes a rear brake disc attached to the rear wheel, a rear brake caliper that pinches the rear brake disc to apply braking, and a rear master cylinder that supplies brake fluid pressure to the brake caliper, and the master cylinder and the ABS unit are located so as to overlap in vehicle side view.

In still another aspect of the invention, braking force is distributed to the front wheel and the rear wheel by an interlocking brake control unit, and the interlocking brake control unit is located between the rear cushion unit and the body frame in the vehicle width direction.

In another aspect of the invention, the ABS unit is formed with a generally rectangular parallelepiped outer shape and wherein, input pipes, to which brake fluid pressure is inputted from operating members provided to respective front wheel and rear wheel brakes, are connected to a rear back surface of the ABS unit, and output pipes, from which control brake fluid pressure is outputted in the ABS unit, are connected to an upper surface of the ABS unit.

In an above aspect of the invention, the rear cushion unit is located on a body centerline extending longitudinally while passing through the center in a vehicle width direction, and the ABS unit is located in rearward of the rear cushion unit and on the body centerline. Since the rear cushion unit and the ABS unit are relatively heavy objects and are located on the body centerline, the left-right weight distribution can be optimized, and the maneuverability of the motorcycle can be improved.

In addition, since the freedom of piping of the brake pipes connected to the respective brakes along the side portion of the body from the ABS unit located on the body centerline increases, and the piping length can be shortened, the resulting weight reduction and fluid loss reduction allow for improved feel when braking.

In another above described aspect of the invention, a lower end of the rear cushion unit is linked to the swing arm via a linking member, and an axis of the rear cushion unit extends in a generally vertical direction. Thus, by linking the rear cushion unit to the swing arm via the linking member, and causing the axis of the rear cushion unit to extend in a generally vertical direction, when the rear cushion unit is located in the center portion in the longitudinal direction of the body, the ABS unit can be located in close proximity rearward of the rear cushion unit. Thus, concentration of mass can be facilitated, and improved maneuverability and compactness of the motorcycle can be achieved.

In another one of the above aspects of the invention, the swing arm includes a pair of arm portions extending longitudinally on the left and right of the rear wheel, and a swing arm cross member linking between the arm portions in front of the rear wheel, and the ABS unit is located above the swing arm cross member. Since the portion of the ABS unit on the lower side of the body can be thus protected by the swing arm cross member, the number of members for performing protection can be reduced. In addition, there is no need for improved strength, allowing the ABS unit to be protected by means of a lightweight structure.

In another one of the above aspects of the invention, the body frame includes a pair of left and right seat rails extending rearward from a central portion thereof to support a seat, and a cushion unit cross member laterally linking the left and right seat rails to one another and supporting an upper end portion of the rear cushion unit, and the ABS unit is secured to the cushion unit cross member and the left and right seat rails. Thus, by securing the ABS unit to members on three sides, namely the cushion unit cross member and the left and right seat rails, it is possible to firmly secure the ABS unit in place to reduce vibration while making the fastening member for the ABS unit compact for weight reduction.

In another one of the above aspects of the invention, the rear brake includes a rear brake disc attached to the rear wheel, a rear brake caliper that pinches the rear brake disc to apply braking, and a rear master cylinder that supplies brake fluid pressure to the rear brake caliper, and the rear master cylinder and the ABS unit are located so as to overlap in vehicle side view. Thus, since the ABS unit and the rear master cylinder can be located in close proximity to each other in the vehicle width direction, and the piping length between the ABS unit and the rear master cylinder can be shortened, fluid loss decreases, thereby making it possible to attain a direct operational feel when braking.

In another one of the above aspects of the invention, braking force is distributed to the front wheel and the rear wheel by an interlocking brake control unit, and the interlocking brake control unit is located between the rear cushion unit and the body frame in the vehicle width direction. Thus, since the interlocking brake control unit can be located in close proximity to the ABS unit by making effective use of the dead space in the body, the piping length between the ABS unit and the interlocking brake control unit can be shortened to achieve fluid loss reduction and weight reduction, and it is possible to attain a direct operational feel when braking. In addition, the rear cushion unit, the ABS unit, and the interlocking brake control unit can be brought into close proximity to each other to achieve concentration of mass.

In another one of the above aspects of the invention, the ABS unit has a rectangular parallelepiped outer shape, and wherein, input pipes, to which brake fluid pressure is inputted from operating members provided to the respective front wheel and rear wheel brakes, are connected to a rear surface of the ABS unit, and output pipes, from which control brake fluid pressure is outputted from the ABS unit, are connected to an upper surface of the ABS unit. Thus, by providing the pipe connecting portions in the upper surface and back surface of the ABS unit, interference between the input pipes and output pipes, and the swing arm located below the ABS unit, can be avoided to increase the freedom of arrangement of the ABS unit. In addition, since the output pipes connected to the upper surface of the ABS unit can be easily routed along the side portion of the body, the output pipes can be shortened, and fluid loss reduction and weight reduction can be achieved.

BRIEF DESCRIPTION OF DRAWINGS

The advantages of the invention will become apparent in the following description taken in conjunction with the drawings, wherein:

FIG. 6 is a main-portion plan view of the ABS unit, the rear cushion unit, and their periphery according to the present invention.

DETAILED DESCRIPTION OF THE INVENTION

Figure 1:
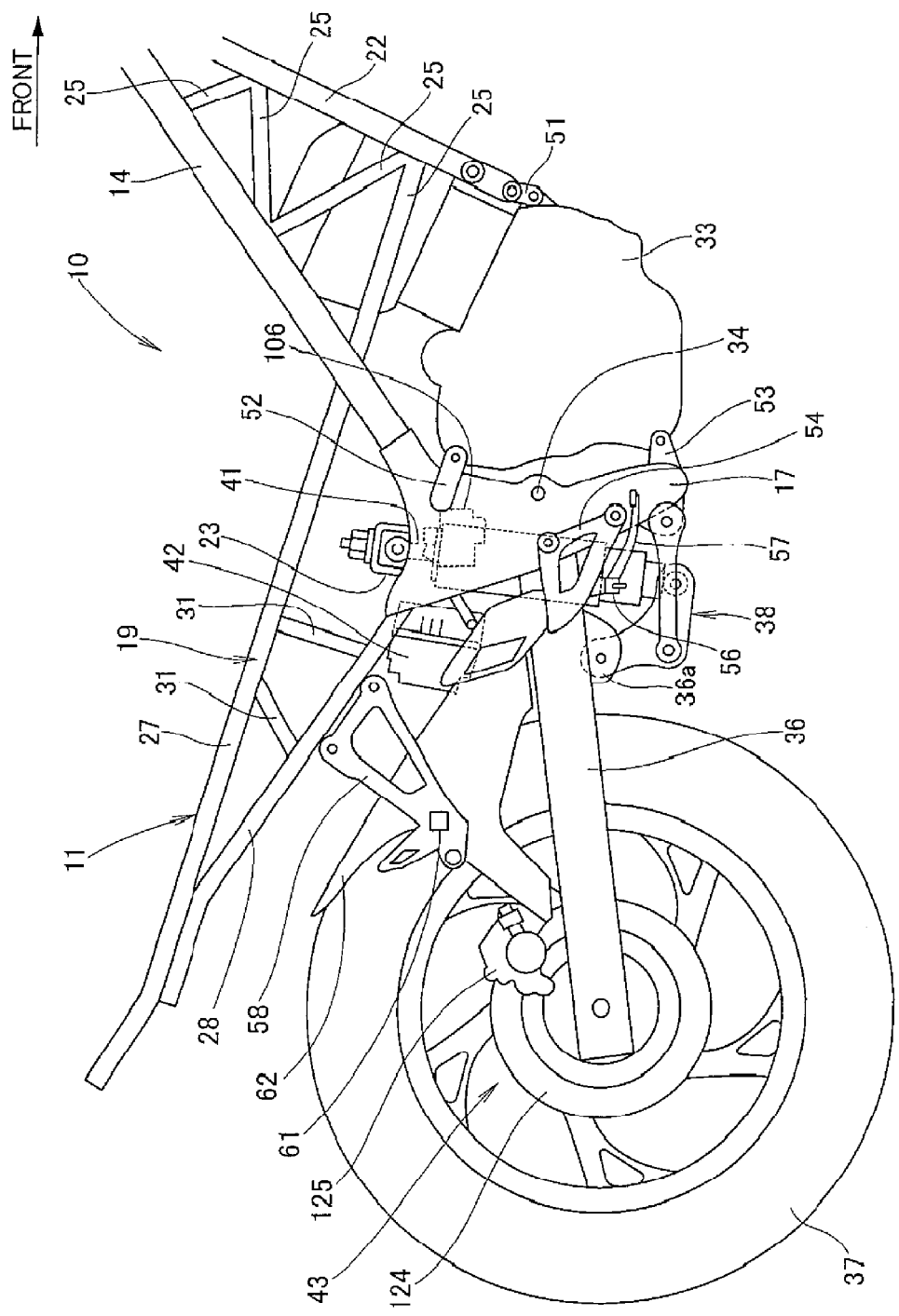
FIG. 1 is a main-portion side view of a motorcycle according to the present invention.

An embodiment of the present invention will be described below with reference to the attached drawings. It should be noted that the terms left, right, front, and rear in the following description indicate directions relative to the rider riding on a vehicle. Also, the drawings are to be viewed in the directions of reference numerals and characters.

An example of the present invention will be described. The arrow (FRONT) in the drawings indicates the front side of the vehicle.

As shown in FIG. 1, a body frame 11 of a motorcycle 10 mainly includes a pair of left and right main frames 13, 14 (only reference numeral 14 on the foreground side is shown) extending obliquely downwards to the rear from a head pipe, a pair of left and right pivot plates 16, 17 (only reference numeral 17 on the foreground side is shown) attached to the rear ends of the main frames 13, 14, a pair of left and right seat rails 18, 19 (only reference numeral 19 on the foreground side is shown) attached to the main frames 13, 14 and the pivot plates 16, 17, a pair of left and right down frames 21, 22 (only reference numeral 22 on the foreground side is shown) extending below the main frames 13, 14 from the head pipe obliquely downwards to the rear, and an upper cross member 23 as a cushion unit cross member passed between the left and right seat rails 18, 19.

A plurality of reinforcing pipes 25 are passed between the main frames 13, 14 and the down frames 21, 22 so as to form a plurality of triangles. Therefore, the body frame 11 becomes lightweight, and also its rigidity can be enhanced.

The seat rails 18, 19 each include an upper rail 27 and a lower rail 28. A plurality of reinforcing pipes 31 are passed between the upper rail 27 and the lower rail 28.

In addition, the motorcycle 10 includes an engine 33 attached to the pivot plates 16, 17 and the down frames 21, 22, a swing arm 36 attached to the pivot plates 16, 17 via a pivot shaft 34 so as to be vertically swingable, a rear wheel 37 attached to the rear end portion of the swing arm 36, a link mechanism 38 as a linking member passed to each of the pivot plates 16, 17 and the swing arm 36, a rear cushion unit 41 passed to each of the upper cross member 23 and the link mechanism 38, a modulator 42 as an ABS unit, which is located in rear of the rear cushion unit 41 and attached to the seat rails 18, 19 and the upper cross member 23 to form a part of an ABS (Anti-lock Brake System), and a rear wheel disc brake 43 as a brake that brakes the rear wheel 37.

A brake device including the modulator 42 and the rear wheel disc brake 43 will be described with reference to the next drawing.

In the drawings, reference numerals 51 to 53 each denote an engine support member for attaching the engine 33 to the body frame 11, reference numeral 54 denotes a first step bracket attached to the pivot plates 16, 17, reference numeral 56 denotes a rider's step attached to the first step bracket 54, reference numeral 57 denotes a brake pedal for the rear wheel which serves as an operating member, reference numeral 58 denotes a second step bracket attached to the seat rails 18, 19, reference numeral 61 denotes a pillion's step attached to the second step bracket 58, and reference numeral 62 denotes a rear fender that covers the top of the rear wheel 37.

Figure 2:
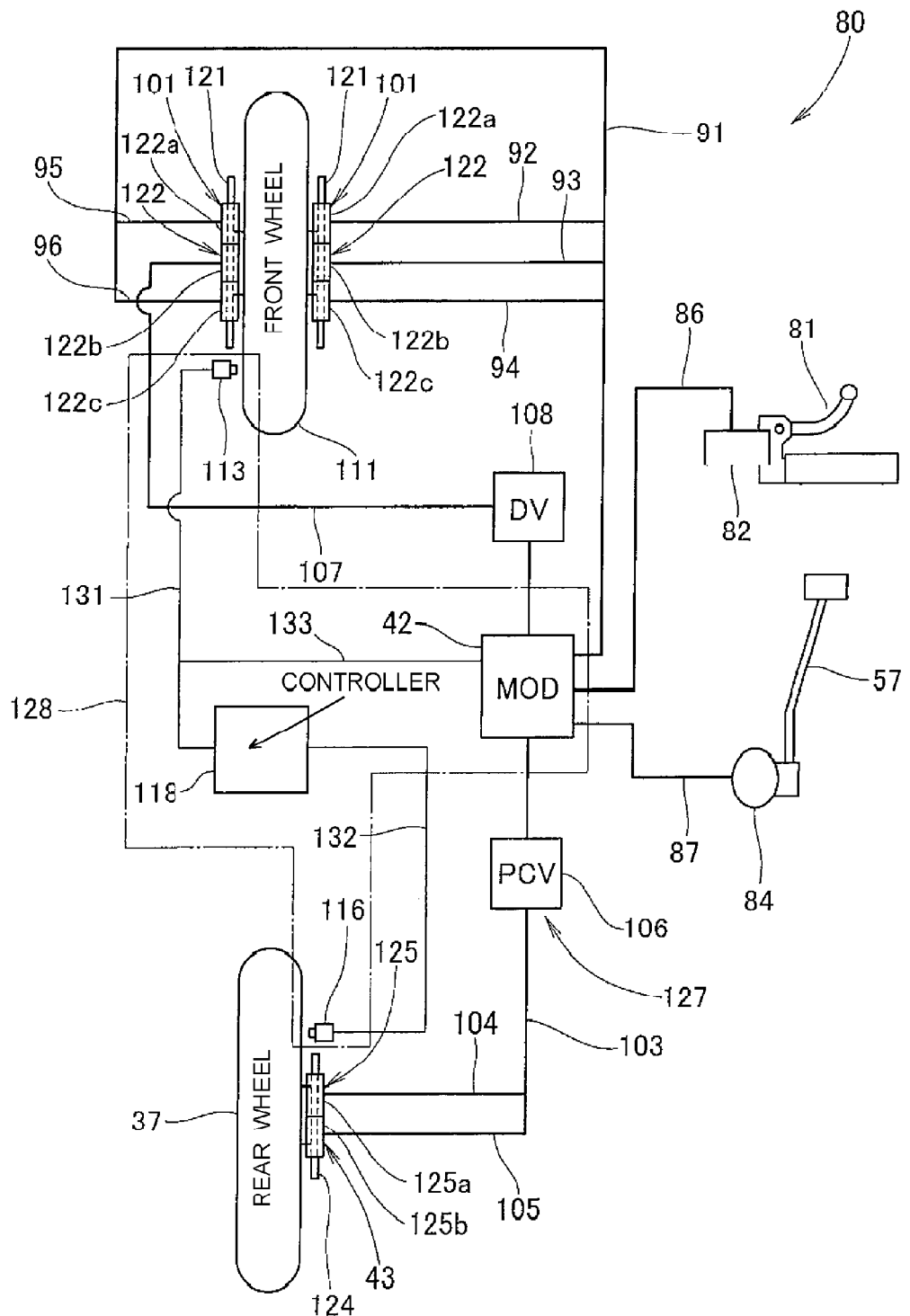
FIG. 2 is a schematic diagram of a brake device of the motorcycle according to the present invention.

As shown in FIG. 2, a brake device 80 includes a brake lever 81 as an operating member attached to a bar handle, a lever-side master cylinder 82 that generates brake fluid pressure through operation of the brake lever 81, the above-described brake pedal 57, a pedal-side master cylinder 84 as a master cylinder that generates brake fluid pressure through operation of the brake pedal 57, the modulator 42 connected to the lever-side master cylinder 82 and the pedal-side master cylinder 84 by pipes 86, 87 serving as input pipes, respectively, front wheel disc brakes 101, 101 each serving as a brake connected to the modulator 42 by pipes 91 to 96 serving as output pipes, the rear wheel disc brake 43 connected to the modulator 42 by pipes 103 to 105, a pressure control valve 106 (hereinafter, simply written as "PCV 106") constituting an interlocking brake control unit provided at a point along the pipe 103 serving as an output pipe, a delay valve (DV) 108 that is provided at a point along a pipe 107, which serves as an output pipe connecting between the front wheel disc brake 101 on one side and the modulator 42, in order to distribute the fluid pressure of brake fluid for actuating the rear wheel disc brake 43 upon operation of the brake pedal 57 also to the front wheel disc brake 101 and to delay the supply of brake fluid pressure to the front wheel disc brake 101 side relative to the rear wheel disc brake 43 side, a front wheel speed sensor 113 that detects the rotating speed of a front wheel 111 (i.e., the wheel speed), a rear wheel speed sensor 116 that detects the rotating speed of the rear wheel 37, and a controller 118 that controls the modulator 42 on the basis of signals from the front wheel speed sensor 113 and the rear wheel speed sensor 116 mentioned above.

The modulator 42 is a braking force controller that controls brake fluid pressure on the front wheel 111 and the rear wheel 37 to prevent the front wheel 111 and the rear wheel 37 from locking up. The modulator 42 includes an electric motor, a pump driven by this electric motor, a plurality of brake fluid passages connected to this pump, a plurality of solenoid valves provided at points along these brake fluid passages, and the like.

The front wheel disc brake 101 includes a brake disc 121 attached to the front wheel 111, and a brake caliper 122 that pinches the brake disc 121 to apply braking. Inside the brake caliper 122, there are provided cylinders 122a, 122b, 122c in each of which a piston that presses on the brake disc 121 via a pad is inserted so as to be movable.

The rear wheel disc brake 43 includes a brake disc 124 attached to the rear wheel 37, and a brake caliper 125 that pinches the brake disc 124 to apply braking. Inside the brake caliper 125, there are provided cylinders 125a, 125b in each of which a piston that presses on the brake disc 124 via a pad is inserted so as to be movable.

The PCV 106 and the delay valve 108 mentioned above constitute a front and rear wheel interlocking brake device 127 as an interlocking brake control unit. The front and rear wheel interlocking brake device 127 makes it possible to actuate the front wheel disc brake 101 on one side in a manner interlocking with actuation of the rear wheel disc brake 43 when the brake pedal 57 is operated.

The modulator 42, the front wheel speed sensor 113, the rear wheel speed sensor 116, and the controller 118 mentioned above constitute an ABS 128. It should be noted that reference numerals 131 to 133 are wires connecting the front wheel speed sensor 113, the rear wheel speed sensor 116, the modulator 42, and the controller 118 to each other.

Figure 3:
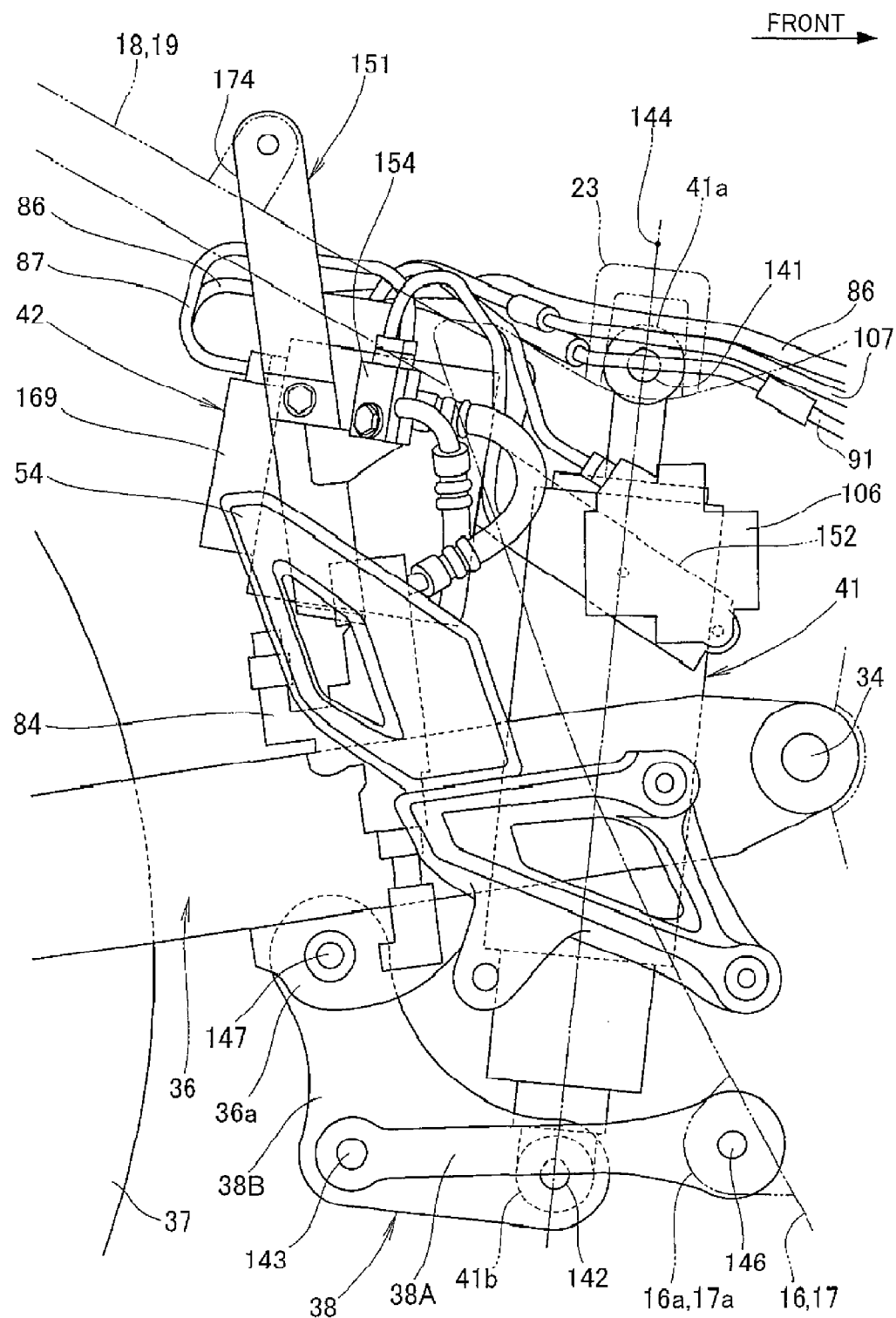
FIG. 3 is a main-portion side view of an ABS unit, a rear cushion unit, and their periphery according to the present invention.

As shown in FIG. 3, the rear cushion unit 41 is located so as to extend generally vertically, with an upper end portion 41a swingably attached to the upper cross member 23 by a bolt 141, and a lower end portion 41b swingably linked to the link mechanism 38 by a linking pin 142. More specifically, the upper end portion 41a is located so as to be located slightly toward the front relative to the lower end portion 41b. It should be noted that reference numeral 144 denotes the axis of the rear cushion unit 41, which extends generally vertically.

The link mechanism 38 includes a first link 38A whose one end is linked by a linking pin 146 to link attaching portions 16a, 17a provided at the rear portions of the pivot plates 16, 17, and a second link 38B whose intermediate portion is linked to the other end of the first link 38A by a linking pin 143, and whose one end is linked by a linking pin 147 to a lower bracket 36a provided at the lower portion of the swing arm 36 and whose other end is linked to the lower end portion 41b of the rear cushion unit 41 by the linking pin 142.

The modulator 42 is attached to the seal rails 18, 19 and the upper cross member 23 via a support bracket 151, and located close to the rear side of the upper portion of the rear cushion unit 41.

Both lateral sides of the lower portion of the modulator 42 are covered by a pair of left and right first step brackets 54, 54 (only reference numeral 54 on the foreground side is shown), thereby making it possible to protect the modulator 42 from flying stones or the like from both lateral sides of the body.

The PCV 106 is attached to the front portion of the support bracket 151 via a support stay 152, and is located in front of the modulator 42 and between the pivot plate 17 on the right side and the rear cushion unit 41 in the vehicle width direction.

The pedal-side master cylinder 84 is located on the outer lateral side of the swing arm 36 and the modulator 42, and the outer lateral side of a part of the pedal-side master cylinder 84 is covered by the first step bracket 54. Thus, the pedal-side master cylinder 84 can be protected by the first step bracket 54.

Reference numeral 154 in the drawing denotes a joint for connecting brake pipes, and is attached to the side portion of the support bracket 151.

Figure 4:
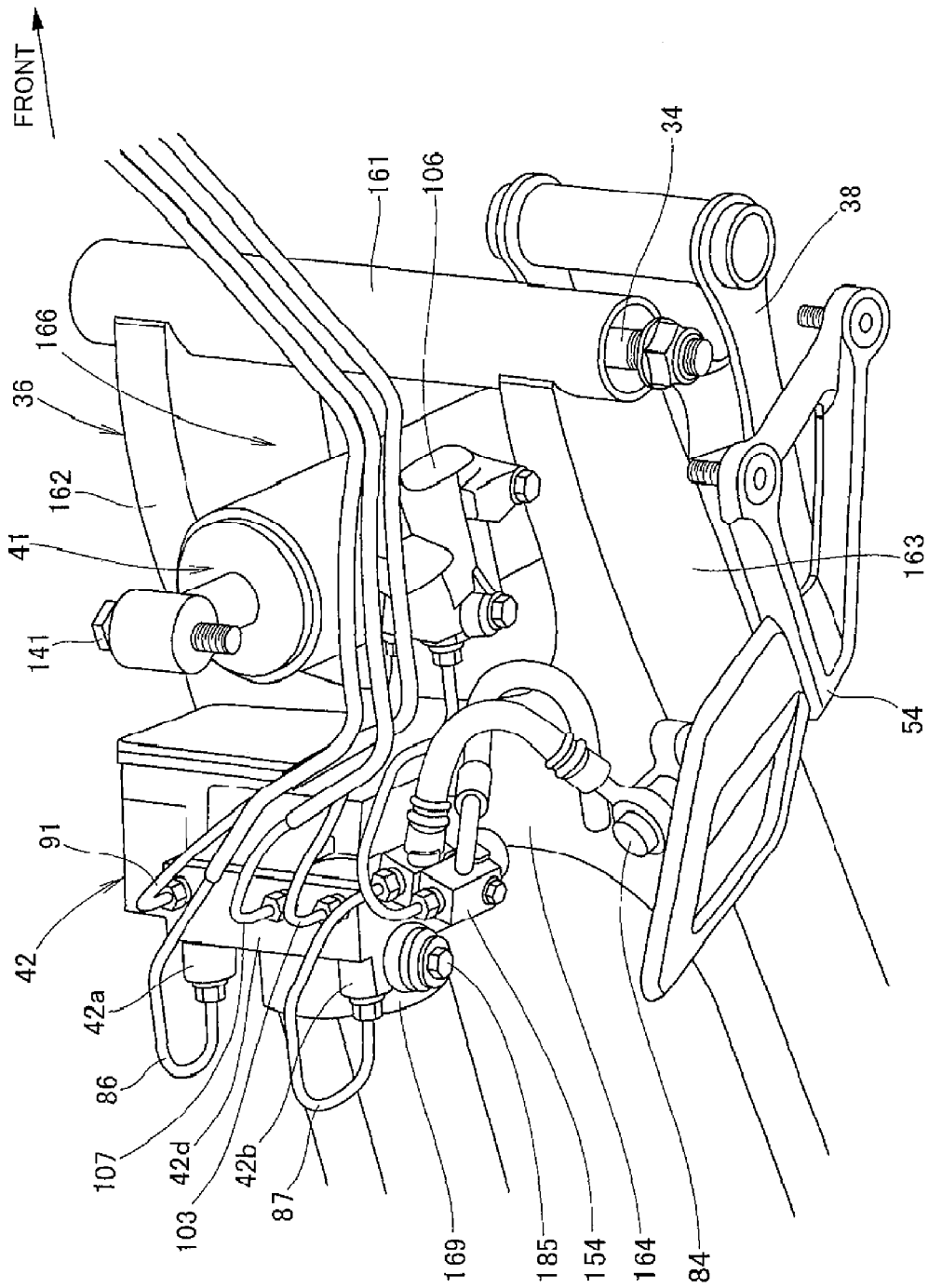
FIG. 4 is a perspective view of the ABS unit, the rear cushion unit, and their periphery according to the present invention.

As shown in FIG. 4, the swing arm 36 includes a tube portion 161 supported on the pivot plate 16, 17 (see FIG. 3) side via the pivot shaft 34, a pair of left and right arm portions 162, 163 extending rearwards from the tube portion 161, and a linking portion 164 as a swing arm cross member extending and linking between the arm portions 162, 163 in the vehicle width direction. The rear cushion unit 41 is located in a space 166 surrounded by the arm portions 162, 163 and the linking portion 164 so as to vertically extend therethrough.

The modulator 42 is located above the linking portion 164 of the swing arm 36. Of a pair of left and right rearward projections 42a, 42b provided so as to project rearwards on a back surface 42f (see FIG. 5) of the modulator 42 formed substantially in the shape of a generally rectangular parallelepiped, the pipe 86 extending from the lever-side master cylinder 82 (see FIG. 2) is connected to the rearward projection 42a on the left side, and the pipe 87 extending from the pedal-side master cylinder 84 (see FIG. 2) is connected to the rearward projection 42b on the right side.

In addition, the pipes 91, 107 extending to the front wheel disc brake 101 (see FIG. 2), and the pipe 103 extending to the rear wheel disc brake 43 (see FIG. 2) via the PCV 106 are connected to an upper surface 42d of the modulator 42.

As shown in FIGS. 4 and 6 mentioned above, since the lower side of the modulator 42 is covered by the linking portion 164 of the swing arm 36, the modulator 42, the pipes 86, 87 connected to the modulator 42, and the connecting portions of the pipes 86, 87 can be protected by the linking portion 164 from stones or the like flying from below.

Figure 5:
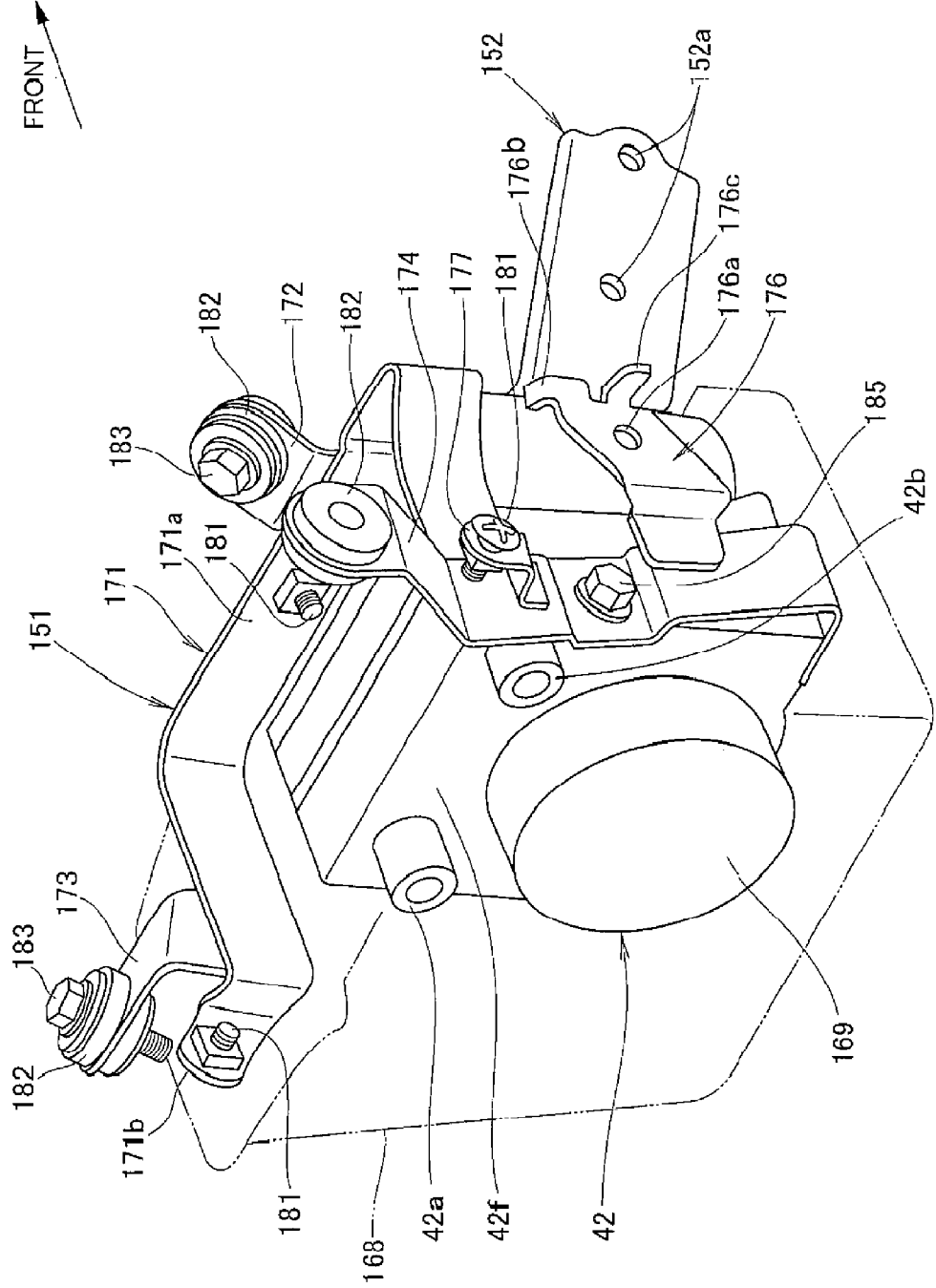
FIG. 5 is a perspective view showing the attaching structure of the ABS unit according to the present invention.

As shown in FIG. 5, the support bracket 151 is attached to the modulator 42, and a protective cover 168 made of resin is attached to the support bracket 151 so as to cover the periphery of the modulator 42 (more specifically, the lower, front, rear, left, and right sides of the modulator 42).

The rearward projections 42a, 42b and an electric motor 169 project from the back or rear surface 42f of the modulator 42.

The support bracket 151 includes an upper C-shaped member 171 that is C-shaped in plan view, a front-side fastening portion 172 attached to the front portion of the upper C-shaped member 171, a left-side fastening portion 173 attached to the left end portion of the upper C-shaped member 171, a right-side fastening portion 174 attached to the right end portion of the upper C-shaped member 171, a forwardly extending member 176 attached to the intermediate portion of the right-side fastening portion 174 so as to extend forward, and a small bracket piece 177 attached above the forwardly extending member 176 in the right-side fastening portion 174.

In the upper C-shaped member 171, the protective cover 168 is attached to each of a front portion 171a, one end portion 171b, and the small bracket piece 177 thereof with a screw 181.

The front-side fastening portion 172 is attached to the upper cross member 23 (see FIG. 3) with a bolt 183 via a mount rubber 182. The left-side fastening portion 173 and the right-side fastening portion 174 are attached to the seat rail 16 (see FIG. 6) on the left side and the seat rail 17 (see FIG. 6) on the right side, respectively, each with the bolt 183 (only one bolt 183 is shown) via the mount rubber 182.

The right-side fastening portion 174 extends vertically, and its lower portion is bent and attached to the lower surface of the modulator 42. It should be noted that reference numeral 185 denotes a bolt for attaching the right-side fastening portion 174 to the side surface of the modulator 42.

The forwardly extending member 176 includes a bolt passage hole 176a through which a bolt for attaching the joint 154 (see FIG. 4) is passed, and two protrusions 176b, 176c each serving as a detect for the joint 154.

The support stay 152 is attached to the front-side fastening portion 172 that extends vertically, and includes two passage holes 152a through which bolts for attaching the PCV 106 (see FIG. 4) are passed.

As shown in FIG. 6, the PCV 106 is located between the rear cushion unit 41 and the pivot plate 16 on the left side.

In addition, the lateral side of the pedal-side master cylinder 84 is covered by the first step bracket 54.

Assuming that the centerline extending longitudinally while passing through the center in the vehicle width direction of the motorcycle 10 (see FIG. 1) is a body centerline 190, the rear cushion unit 41 and the modulator 42 are located on the body centerline 190.

More specifically, the axis 144 (see FIG. 3) of the rear cushion unit 41 coincides with the body centerline 190 in plan view. In addition, a modulator centerline 191, which extends longitudinally while passing through the center in the vehicle width direction of the modulator 42, is offset to the right by a distance 61 with respect to the body centerline 190, and an axis 192 of the rotating shaft of the electric motor 169 provided to the modulator 42 is further offset to the right by a distance 62 with respect to the modulator centerline 191.

In this way, by arranging both the members that are relatively heavy objects, namely the rear cushion unit 41 and the modulator 42, on the body centerline 190, the left-right balance of the motorcycle 10 can be improved, and the maneuverability of the motorcycle 10 such as turning can be enhanced.

In addition, since the rear cushion unit 41 and the modulator 42 are located at the center in the vehicle width direction, are in close proximity to each other longitudinally, and further are in close proximity to the pivot plates 16, 17, the engine 33, and the like provided at positions near the center in the vehicle's longitudinal direction (for example, the center of the line segment connecting between the front wheel axle and the rear wheel axle), mass can be concentrated at the center of the motorcycle 10, which also makes it possible to enhance maneuverability.

In addition, since the above-mentioned axis 192 passes through the center of the lateral width of the upper surface 42d of the modulator 42, the pipes 91, 107, 103 connected to the upper surface 42d are in proximity or offset to the right side with respect to the body centerline 190. Thus, the pipes 91, 107, 103 can be easily located so as to extend longitudinally along the right end of the body from the modulator 42, thereby making it possible to shorten the piping length.

Therefore, the pipes 91, 107, 103 can be made lightweight, and the reduction in pressure loss of the pipes 91, 107, 103 allows for improved operational feel (direct feel) of the brake pedal 57 (see FIG. 2) and the brake lever 81 (see FIG. 2).

As shown in FIGS. 1, 2, and 6 above, in the motorcycle 10 including: the front wheel disc brake 101 and the rear wheel disc brake 43 as brakes that respectively brake the front wheel 111 and the rear wheel 37; the modulator 42 as an ABS unit that controls the braking force of the front wheel disc brake 101 and the rear wheel disc brake 43; the pipes 91 to 96, and 103 to 105 connecting the modulator 42 to the front wheel disc brake 101 and the rear wheel disc brake 43; the swing arm 36 swingably supported on the body frame 11; and the rear cushion unit 41 passed to each of the swing arm 36 and the body frame 11 and located in front of the rear wheel 37 that is supported on the rear end portion of the swing arm 36, the rear cushion unit 41 is located on the body centerline 190 extending longitudinally while passing through the center in the vehicle width direction, and the modulator 42 is located rearward of the rear cushion unit 41 and on the body centerline 190.

According to the above-mentioned configuration, since the rear cushion unit 41 and the modulator 42 that are relatively heavy objects are located on the body centerline 190, the left-right weight distribution of the motorcycle 10 can be optimized, and the maneuverability of the motorcycle 10 can be improved.

In addition, since the freedom of piping of the pipes 91 to 96, and 103 to 105 connected to the front wheel disc brake 101 and the rear wheel disc brake 43 along the side portion of the body from the modulator 42 located on the body centerline 190 increases, and the piping length can be shortened, the resulting weight reduction and fluid loss reduction allow for improved feel when braking.

As shown in FIGS. 1 and 3 above, the lower end of the rear cushion unit 41 is linked to the swing arm 36 via the link mechanism 38 as a linking member, and the axis 144 of the rear cushion unit 41 extends in the vertical direction. Thus, by linking the rear cushion unit 41 to the swing arm 36 via the link mechanism 38, and causing the axis of the rear cushion unit 41 to extend in a generally vertical direction, when the rear cushion unit 41 is located in the center portion in the longitudinal direction of the body or in its vicinity, the modulator 42 can be located in close proximity rearward of the rear cushion unit 41. Thus, concentration of mass can be facilitated, and improved maneuverability and compactness of the motorcycle 10 can be achieved.

As shown in FIG. 6 above, the swing arm 36 includes the pair of arm portions 162, 163 extending longitudinally on the left and right of the rear wheel 37, and the linking portion 164 as a swing arm cross member linking between the arm portions 162, 163 in front of the rear wheel 37, and the modulator 42 is located above the linking portion 164. Since the portion of the modulator 42 on the lower side of the body can be thus protected by the linking portion 164, the number of members for performing protection can be reduced. In addition, there is no need to improve the strength of the protective cover 168, allowing the modulator 42 to be protected by means of a lightweight structure.

As shown in FIGS. 1 and 6 above, the body frame 11 includes the pair of left and right seat rails 18, 19 extending rearward from the body's central portion to support a seat, and the upper cross member 23 as a cushion unit cross member laterally linking the seat rails 18, 19 to each other and supporting the upper end portion of the rear cushion unit 41, and the modulator 42 is secured to the upper cross member 23 and the left and right seat rails 18, 19. Thus, by securing the modulator 42 to members on three sides, namely the upper cross member 23 and the left and right seat rails 18, 19, it is possible to firmly secure the modulator 42 in place to reduce vibration while making the fastening member for the modulator 42 compact for weight reduction.

As shown in FIGS. 1 to 3 above, the rear wheel disc brake 43 on the rear wheel 37 side includes the brake disc 124 attached to the rear wheel 37, the brake caliper 125 that pinches the brake disc 124 to apply braking, and the pedal-side master cylinder 84 as a master cylinder that supplies brake fluid pressure to the brake caliper 125, and the pedal-side master cylinder 84 and the modulator 42 are located so as to overlap in side view of the vehicle. Thus, since the modulator 42 and the pedal-side master cylinder 84 can be located in close proximity to each other in the vehicle width direction, and the piping length between the modulator 42 and the pedal-side master cylinder 84 can be shortened, fluid loss decreases, thereby making it possible to attain a direct operational feel when braking.

As shown in FIGS. 2 and 3 above, braking force is distributed to the front wheel 111 and the rear wheel 37 by the front and rear wheel interlocking brake device 127 as an interlocking brake control unit, and the front and rear wheel interlocking brake device 127, more specifically the PCV 106 constituting the front and rear wheel interlocking brake device 127, is located between the rear cushion unit 41 and the pivot plate 17 on the right side of the body frame 11 in the vehicle width direction. Thus, since the front and rear wheel interlocking brake device 127 can be located in close proximity to the modulator 42 by making effective use of the dead space in the body, the piping length between the modulator 42 and the front and rear wheel interlocking brake device 127 can be shortened to achieve fluid loss reduction and weight reduction, and it is possible to attain a direct operational feel when braking. In addition, the rear cushion unit 41, the modulator 42, and the front and rear wheel interlocking brake device 127 can be brought into close proximity to each other to achieve concentration of mass.

As shown in FIGS. 3 to 5 above, the modulator 42 is formed with an outer shape close to a rectangular parallelepiped, the pipes 86, 87 as input pipes to which brake fluid pressure is inputted from the brake lever 81 and the brake pedal 57 that are operating members provided to the front wheel disc brake 101 and the rear wheel disc brake 43 on the front wheel 111 and the rear wheel 37, respectively, are connected to the back surface 42f of the modulator 42, and the pipes 91, 103, 107 as output pipes from which control brake fluid pressure is outputted in the modulator 42 are connected to the upper surface 42d of the modulator 42. Thus, by providing the pipe connecting portions in the upper surface 42d and the back surface 42f of the modulator 42, interference between the pipes 86, 87 and the pipes 91, 103, 107, and the swing arm 36 located below the modulator 42 can be avoided to increase the freedom of location of the modulator 42. In addition, since the pipes 91, 103, 107 connected to the upper surface 42d of the modulator 42 can be easily rounted along the side portion of the body, the pipes 91, 103, 107 can be shortened, and fluid loss reduction and weight reduction can be achieved.

It should be noted that while in this example the modulator 42 is located on the body centerline 190 as shown in FIG. 6, further, the center of gravity of the modulator 42 may be located on the body centerline 190. When the center of gravity of the modulator 42 that is a relatively heavy object is located at the center in the vehicle width direction in this way, it is possible to achieve a further improvement in the left-right balance of the body.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A motorcycle, comprising:
   front and rear brakes that respectively brake a front wheel and a rear wheel;
   an ABS unit that controls braking force of said brakes;
   pipes connecting each of said brakes with said ABS unit;
   a swing arm swingably supported on a body frame; and
   a rear cushion unit connecting said swing arm to said body frame and located in front of the rear wheel, said rear cushion unit supported on a front end portion of said swing arm,
   wherein said rear cushion unit is located on a body centerline extending longitudinally while passing through the center in a vehicle width direction, and wherein said ABS unit is located rearward of said rear cushion unit and on the body centerline, wherein:
   said body frame includes a pair of left and right seat rails extending rearward from a central portion thereof to support a seat, and a cushion unit cross member laterally linking said left and right seat rails to one another and supporting an upper end portion of said rear cushion unit; and
   said ABS unit being secured to said cushion unit cross member and said left and right seat rails.

2. The motorcycle according to claim 1, wherein a lower end of said rear cushion unit is connected to said swing arm via a linking member, and an axis of said rear cushion unit extends in a generally vertical direction.

3. The motorcycle according to claim 1, wherein:
   said swing arm includes a pair of arm portions extending longitudinally on the left and right sides of the rear wheel, and a swing arm cross member linking between said pair of arm portions in front of the rear wheel; and
   said ABS unit is located above said swing arm cross member.

4. The motorcycle according to claim 1, wherein said rear the brake includes a rear brake disc attached to the rear wheel, a rear brake caliper that pinches the brake disc to apply braking, and a rear master cylinder that supplies brake fluid pressure to said rear brake caliper, and wherein said rear master cylinder and said rear ABS unit are positioned so as to overlap in vehicle side view.

5. The motorcycle according to claim 1, wherein braking force is distributed to the front wheel and the rear wheel by an interlocking brake control unit, and wherein said interlocking brake control unit is located between said rear cushion unit and said body frame in a vehicle width direction.

6. A motorcycle, comprising:
   front and rear brakes that respectively brake a front wheel and a rear wheel;
   an ABS unit that controls braking force of said brakes;
   pipes connecting each of said brakes with said ABS unit;
   a swing arm swingably supported on a body frame; and a rear cushion unit connecting said swing arm to said body frame and located in front of the rear wheel, said rear cushion unit supported on a front end portion of said swing arm, wherein said rear cushion unit is located on a body centerline extending longitudinally while passing through the center in a vehicle width direction, and wherein said ABS unit is located rearward of said rear cushion unit and on the body centerline, and wherein said ABS unit has a generally rectangular parallelepiped outer shape, and wherein, input pipes, to which brake fluid pressure is inputted from operating members provided to respective front wheel and rear wheel brakes, are connected to a rear surface of said ABS unit, and output pipes from which control brake fluid pressure is outputted from said ABS unit, are connected to an upper surface of said ABS unit.

7. The motorcycle according to claim 2, wherein:
said swing arm includes a pair of arm portions extending longitudinally on the left and right sides of the rear wheel, and a swing arm cross member linking between said pair of arm portions in front of the rear wheel; and
said ABS unit is located above said swing arm cross member.

8. The motorcycle according to claim 2, wherein:
said body frame includes a pair of left and right seat rails extending rearward from a central portion thereof to support a seat, and a cushion unit cross member laterally linking said left and right seat rails to one another and supporting an upper end portion of said rear cushion unit; and
said ABS unit being secured to said cushion unit cross member and said left and right seat rails.

9. The motorcycle according to claim 3, wherein:
said body frame includes a pair of left and right seat rails extending rearward from a central portion thereof to support a seat, and a cushion unit cross member laterally linking said left and right seat rails to one another and supporting an upper end portion of said rear cushion unit; and
said ABS unit being secured to said cushion unit cross member and said left and right seat rails.

10. The motorcycle according to claim 2, wherein said rear the brake includes a rear brake disc attached to the rear wheel, a rear brake caliper that pinches the brake disc to apply braking, and a rear master cylinder that supplies brake fluid pressure to said rear brake caliper, and wherein said rear master cylinder and said rear ABS unit are positioned so as to overlap in vehicle side view.

11. The motorcycle according to claim 3, wherein said rear the brake includes a rear brake disc attached to the rear wheel, a rear brake caliper that pinches the brake disc to apply braking, and a rear master cylinder that supplies brake fluid pressure to said rear brake caliper, and wherein said rear master cylinder and said rear ABS unit are positioned so as to overlap in vehicle side view.

12. The motorcycle according to Claim 1, wherein said rear the brake includes a rear brake disc attached to the rear wheel, a rear brake caliper that pinches the brake disc to apply braking, and a rear master cylinder that supplies brake fluid pressure to said rear brake caliper, and wherein said rear master cylinder and said rear ABS unit are positioned so as to overlap in vehicle side view.

13. The motorcycle according to claim 2, wherein braking force is distributed to the front wheel and the rear wheel by an interlocking brake control unit, and wherein said interlocking brake control unit is located between said rear cushion unit and said body frame in a vehicle width direction.

14. The motorcycle according to claim 3, wherein braking force is distributed to the front wheel and the rear wheel by an interlocking brake control unit, and wherein said interlocking brake control unit is located between said rear cushion unit and said body frame in a vehicle width direction.

15. The motorcycle according to claim 1, wherein braking force is distributed to the front wheel and the rear wheel by an interlocking brake control unit, and wherein said interlocking brake control unit is located between said rear cushion unit and said body frame in a vehicle width direction.

16. The motorcycle according to claim 4 wherein braking force is distributed to the front wheel and the rear wheel by an interlocking brake control unit, and wherein said interlocking brake control unit is located between said rear cushion unit and said body frame in a vehicle width direction.

17. The motorcycle according to claim 2, wherein said ABS unit has a generally rectangular parallelepiped outer shape, and wherein, input pipes, to which brake fluid pressure is inputted from operating members provided to respective front wheel and rear wheel brakes, are connected to a rear surface of said ABS unit, and output pipes from which control brake fluid pressure is outputted from said ABS unit, are connected to an upper surface of said ABS unit.

18. The motorcycle according to claim 3, wherein said ABS unit has a generally rectangular parallelepiped outer shape, and wherein, input pipes, to which brake fluid pressure is inputted from operating members provided to respective front wheel and rear wheel brakes, are connected to a rear surface of said ABS unit, and output pipes from which control brake fluid pressure is outputted from said ABS unit, are connected to an upper surface of said ABS unit.

19. The motorcycle according to claim 1, wherein said ABS unit has a generally rectangular parallelepiped outer shape, and wherein, input pipes, to which brake fluid pressure is inputted from operating members provided to respective front wheel and rear wheel brakes, are connected to a rear surface of said ABS unit, and output pipes from which control brake fluid pressure is outputted from said ABS unit, are connected to an upper surface of said ABS unit.

* * * * *